INVENTOR.
CHARLES F. HOBBS.
BY Wade Koontz AND Orlando R. McCoy
ATTORNEYS

Aug. 6, 1957 C. F. HOBBS 2,802,208

RADIO FREQUENCY MULTIPLEXING

Filed June 25, 1952 6 Sheets-Sheet 2

INVENTOR.
CHARLES F. HOBBS
BY Wade Koontz AND
Orlando Y. Molloy
ATTORNEYS.

RADIO FREQUENCY MULTIPLEXING

Filed June 25, 1952 6 Sheets-Sheet 3

INVENTOR.
CHARLES F. HOBBS.
BY Wade Koontz AND
Orlando Z. Macaf
ATTORNEYS.

INVENTOR.
CHARLES F. HOBBS
BY Wade Koontz AND
Orlando M. Macey
ATTORNEYS.

RADIO FREQUENCY MULTIPLEXING

Filed June 25, 1952 6 Sheets-Sheet 5

INVENTOR.
CHARLES F. HOBBS
BY Wade Koontz AND
Orlando Z. McKey
ATTORNEYS.

INDIVIDUAL CHANNEL NET FOR AIR TRAFFIC CONTROL

INVENTOR.
CHARLES F. HOBBS.
BY Wade Koontz AND
Orlando M. Maloy
ATTORNEYS.

1

2,802,208

RADIO FREQUENCY MULTIPLEXING

Charles F. Hobbs, Medford, Mass.

Application June 25, 1952, Serial No. 295,595
6 Claims. (Cl. 343—176)
(Granted under Title 35, U. S. Code (1952), sec. 266)

The invention described herein may be manufactured and used by or for the Government for governmental purposes without payment to me of any royalty thereon.

This invention relates to radio communication and more particularly to the close spacing of radio channels or to a radio communication multiplexing system and method for increasing the number of available channels in the radio frequency spectrum.

In the past radio communication from point-to-point and for aircraft, ship and mobile applications, it has been customary to reserve guard bands between the individual channels which often exceeded the channel bandwith in the very high frequency and higher radio frequency bands. Multiplexing, or the transmission of two or more messages over the same transmission circuit has been practiced in telephony in the past.

The present invention concerns an improved frequency multiplexing radio communication system, using subcarrier techniques together with single-side-band techniques and using only as much bandwidth as is used ordinarily for transmitting a particular type of information at low frequencies. For amplitude modulated voice communication, an illustrative channel spacing would be a maximum of 10 kilocycles.

An object of the present invention is to provide a method for increasing the number of available channels in the radio frequency spectrum by frequency multiplexing radio signals emitted by a number of transmitters.

Another object is to provide a method of accomplishing radio signal multiplexing with known and readily available equipment.

Another object is to provide a method of eliminating relative frequency drift between a plurality of transmitters and between a local oscillator of a receiver and the transmitted signal being received.

A further object is to provide a method for generating a frequency-division-multiplexed signal, the several radio frequency components of which are generated by different transmitters.

Another object is to maintain high relative stability between transmitters and receivers in radio communication.

Another object of the present invention is to provide a large increase in the efficiency of the use of the available radio frequency spectrum over present day practices.

A further object is to provide a large number of channels in a limited band spectrum for use in air traffic control, communication between vehicles and the like.

Another object is to provide a system wherein teletype, facsimile and telemetering signals can be transmitted over the same bandwidth as that required at low frequencies.

A further object is to provide a multiplexing radio communication system of an improved relative stability at high radio frequencies between the transmitters of a group even though the transmitters are physically separated from each other with a minimized oscillator drift and instability by having all the transmitters in a group derive identical carrier frequencies from a common standard frequency transmission source and from one or more subcarrier frequencies.

2

Another object is to provide a frequency-division multiplexing radio communication system that does not require excessive guard bands between each pair of signals transmitted that have been required previously because of oscillator instability.

With the above and other objects in view that will be apparent from the following description, an illustrative adaptation of the system and method of the present invention is represented in the accompanying drawings wherein:

Figure 1 compares the past utilization of an illustrative portion of the radio frequency spectrum with its potential utilization;

Figure 1:
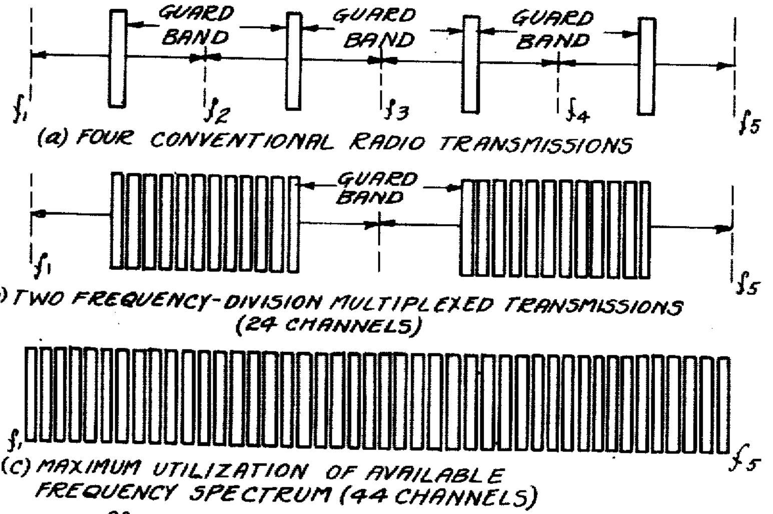

The multiplexing radio communication system contemplated hereby applies to a radio link between airborne and ground radio equipment, radio broadcasting, ship-to-ship and ship-to-shore radio, mobile communication and other radio services.

The terminology used herein comprises: Alpha sub $i$ or $a_i$ which is a carrier frequency; $f_s$ is a standard frequency, with $a_i$ equal to a multiple of $f_s$ or $nf_s$; beta sub $j$ or $B_j$ which is a subcarrier frequency; gamma sub $i$ or $r_i$ is another carrier frequency also a harmonic of $f_s$; and epsilon sub $k$ or $E_k$ is an audio or other message signal frequency band. $B_j$ plus or minus $E_k$ are side-band frequencies that, when heterodyned, are translated in frequency by $a_i$ to provide as outgoing signal $a_i$ plus $B_j$ plus or minus $E_k$. Phi or $\phi$ is phase shift expressed in radians.

The present invention pertains to a method for increasing the number of available channels in a radio frequency spectrum by frequency-division multiplexing radio signals emitted by a number of transmitters, even though the transmitters are physically separated from each other. In the past at high radio frequencies the number of available radio channels in a given band of frequencies has been determined largely by expected oscillator drift and instability rather than by the bandwidths required to transmit the desired information.

The present invention maintains a high degree of relative stability between members of a plurality of transmitters by causing the transmitters to use identical carrier frequencies derived from a common source as that designated herein a standard frequency $f_s$ transmission. The frequency band covered by each signal actually transmitted is derived from this carrier and one or more subcarrier frequencies by the use of single-side-band techniques. The relative stability between signals is that of the subcarrier oscillators rather than that of carrier frequency signals. This allows each transmission to occupy only that bandwidth actually required to transmit the desired information. The nature of the combined signal emitted from the group of transmitters is similar to the signal emitted by a multi-channel frequency-division-multiplexed transmitter.

A group of transmitters contemplated hereby all use the same carrier frequency alpha *i* or $a_i$ herein, but use subcarrier and single-side-band techniques to produce signals of different frequencies that are highly stable relative to each other. In one version of this invention, the carrier frequency alpha *i* is generated by and is transmitted by only one transmitter in the group. This transmitter may transmit the carrier only or it may also generate and transmit one or more information carrying signals. All other stations use auxiliary receivers to receive the said carrier and use it as the radio frequency reference in their respective transmitters. As an alternate method, all transmitters in a group may derive the same carrier frequency alpha *i* from a lower frequency standard signal $f_s$ broadcast throughout a large area, such as throughout North America for that specific purpose. In either situation, the identical carrier frequency alpha *i* is available to all transmitters and receivers in a group.

Other groups of transmitters in the same geographical area may use a different carrier frequency for each group. The separation of the carrier frequencies is determined by the total bandwith of the subcarriers that are used in each group. The several carrier frequencies also may be made highly stable relative to each other by having all carrier frequencies derived from the standard frequency $f_s$ that is available for such purpose. If it be assumed that the standard-signal frequency $f_s$ is five megacycles per second, then the carrier frequency alpha *i* may be separated by five megacycles per second or multiples thereof by using the correct harmonics of the standard signal $f_s$ for the several carrier frequencies, or the carrier frequency alpha *i* equals multiples of the standard signal frequency or $nf_s$.

In signal transmission, information to be transmitted first is impressed on a subcarrier beta *j* or $B_j$ herein, by a desired conventional modulation method. One or more modulated subcarriers are used to modulate each single-side-band transmitter of a group of transmitters operating at the same carrier frequency alpha *i*. The signals transmitted are centered on frequencies equal to the carrier frequency alpha *i* + or − the respective subcarrier frequency beta *j*. In this manner the relative frequency stability of the system is that of the relatively low frequency subcarrier beta *j* rather than that of the high frequency carrier.

Several separate signals emitted by a group of transmitters operating on the same carrier frequency alpha *i* form a resultant signal which is similar to the signal emitted by one single-side-band transmitter when modulated simultaneously by a number of subcarrier signals.

The receivers used with this system resemble those used with other frequency-division-multiplexing systems in that a group of information carrying signals are selected by the radio frequency sections of the receivers. In case the carrier alpha *i* is to be obtained from a low frequency standard signal $f_s$, a separate narrow radio frequency amplifier and frequency multiplier is a necessary auxiliary to each receiver. In an early stage of the receiver, a high level carrier signal alpha *i* is mixed with the information carrying signals. The resultant is demodulated by a crystal or other detector to produce several subcarrier signals. The rest of the receiver is similar to a conventional low frequency communication receiver in that it selects the desired message signal and amplifies and detects it to release the conveyed information.

In the practice of the present invention, a double-frequency-selection process enables a single receiver to be used for a much larger number of channels than is feasible for a conventional communications receiver. Greater ease of tuning to a particular frequency also results. The invention provides a means for frequency-division multiplexing on the same carrier a number of signals transmitted from different geographical locations.

The present invention approaches the problem of maximum use of a radio frequency spectrum by making use of the high stability of low radio frequency oscillators instead of seeking improved stability of high radio frequency oscillators.

The present invention proposes the use of subcarrier techniques together with single-side-band transmission and transmission of a carrier by one transmitter only as a convenient means of multiplexing the signals from a number of separate tarnsmitters and the conservative use of the frequency spectrum by the occupancy of only as much bandwidth as is used ordinarily for transmitting a particular type of information at lower frequencies, such as illustratively for amplitude modulated voice communications the channel spacing would be a maximum of ten kilocycles.

As an illustrative example of the present invention, an air traffic control center receives the five megacycle signal of the Washington, D. C. National Bureau of Standards Radio Station, identified by the letters WWV, that transmits continuously at 5, 10 and 15 megacycles modulated by audio frequencies of 440 and 4000 cycles per second, in which the accuracy is better than one part in 10 million. The trasmissions from the station WWV are used in lieu of a crystal to control the carrier frequency of the communication system contemplated hereby. The carrier frequency used is a harmonic of five megacycles, such as for example, 1000 megacycles per second. Another control center uses a carrier frequency of 1005 megacycles per second. With 5 megacycles per second spacing between carrier frequencies, up to approximately 500 channels are provided for each control center by the use of crystal controlled subcarrier frequencies spaced not more than 10 kilocycles apart. In the event more channels are required, additional subcarrier frequencies may be assigned in groups of five megacycles per second, and a correspondingly larger spacing between carrier frequencies is used. The present invention illustratively applies to the channel transmission and reception of electromagnetic energy at frequencies in excess of 30 megacycles per second.

All aircraft in a group use the same carrier frequency alpha *i* but one that is different than that used by the ground station with which the aircraft are communicating. In the example the group using 1000 megacycles per second for ground-to-air communications might use 1500 megacycles per second for air-to-ground communications. As a result, the ground-to-air channels remain open at all times to facilitate the continuous transmission of data and other information.

Where it is desired that a number of messages be transmitted between two given points, the use of frequency-division multiplexing provides a large increase in the use of the available spectrum. The improvement results from the use of comparatively low frequency subcarriers to produce adjacent channel signals of high relative stability even though the absolute stability of the transmission may be no greater than that for a single channel transmission, as represented in Figure 1 of the accompanying drawings.

In Figure 1(*a*) four single channel transmissions are shown in the frequency band $f_1$ to $f_5$. In Figure 1(*b*) the same band $f_1$ to $f_5$ is occupied by two 12 channel frequency division multiplexed transmissions aggregating 24 channels. It will be noted that the same guard bands are used between the transmissions in both (*a*) and (*b*) in Figure 1. It will be apparent from Figure 1(*c*) that if the guard bands are eliminated maximum utilization of the spectrum is obtained by the use of frequency-division multiplexing to provide 44 channels betwen the same frequency limits $f_1$ and $f_5$.

Figure 2:
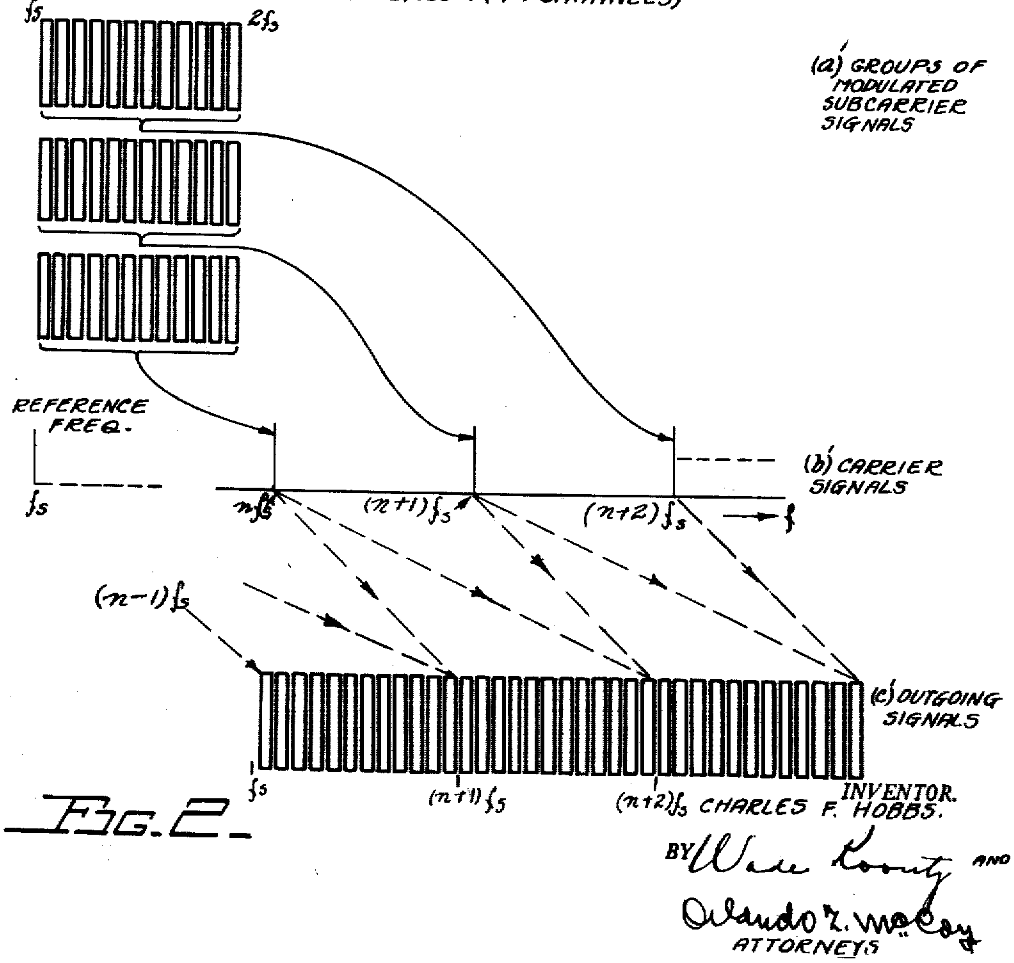
Figure 2 illustrates the method of achieving maximum utilization of the available frequency spectrum of Figure 1 in the practice of the present invention.

Maximum use of the available frequency spectrum as indicated in Figure 1(*c*) is obtained in the practice of this invention as illustrated in Figure 2 wherein carriers that have a high degree of relative stability are obtained by the use of several harmonics of a reference or standard frequency $f_s$ used in lieu of locally controlled oscillations. Messages to be transmitted are impressed on groups of subcarrier signals such that each group of resultant signals covers a frequency band equal to the reference frequency $f_s$. The band $f_s$ to $2f_s$ is convenient from the standpoints of receiver tuning range and image rejection. The several groups of subcarrier signals are then used to amplitude modulate their respective carriers and the upper side bands of this final modulation process are selected for transmission, thus producing a maximum number of information channels in a given frequency band.

Figure 3:
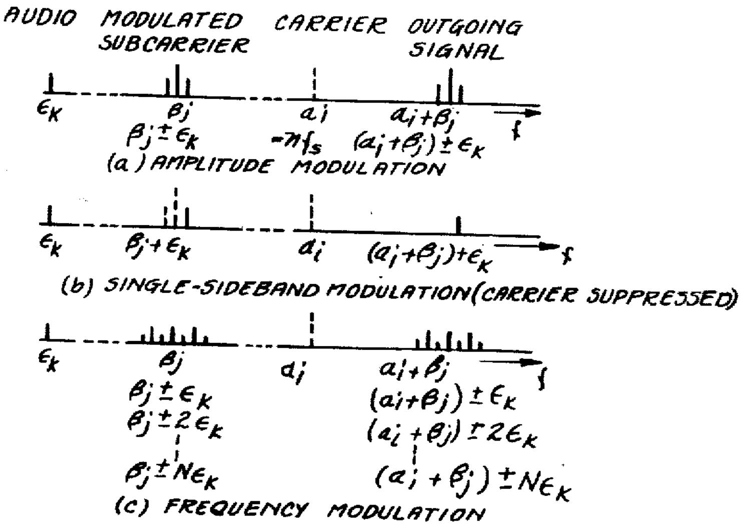
Figure 3 illustrates the use of three different types of modulation in the practice of the present invention.

In Figure 3 of the accompanying drawings are represented three different types of modulation indicated by the letters (*a*) (*b*) and (*c*). In Figure 3(*a*) amplitude modulation, an audio signal of frequency $E_k$ is used to amplitude modulate the subcarrier of frequency $B_j$ thereby producing two side bands of frequency $B_j$ plus $E_k$ and $B_j$ minus $E_k$. In the final modulation or heterodyning process the amplitude modulated signal is translated in frequency by the amount of the carrier frequency $a_i$ which is a multiple of the standard frequency $f_s$. In Figure 3(*b*) the first modulation process produces the single-side-band signal of frequency $B_j$ plus $E_k$ which is then translated in frequency by the amount $a_i$ as above. The use of frequency modulation that pertains to the present invention is represented in Figure 3(*c*) to provide a desired number of side bands as shown.

Figure 4:
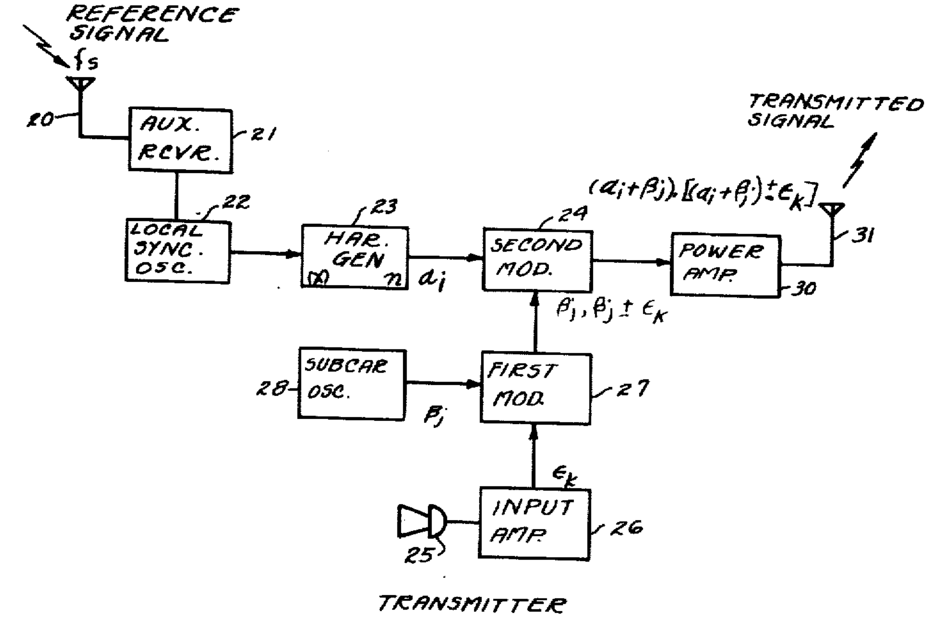
Figure 4 is a simplified block diagram of a transmitter using the proposed stabilization method.

In Figure 4 of the accompanying drawings is shown a simplified block diagram of a transmitter adapted for using the proposed stabilization method disclosed herein. In the circuit shown in Figure 4, the standard $f_s$ is intercepted as a reference signal by receiving antenna 20 and is passed to an auxiliary receiver 21. Output from the auxiliary receiver 21 is passed to and stabilizes a synchronous local oscillator 22 the output of which is passed to a harmonic generator 23 where the desired carrier frequency $a_i$ is generated by harmonic amplification. In this part of the circuit the standard frequency $f_s$ undergoes harmonic amplification to provide the desired carrier frequency $a_i$. The carrier frequency $a_i$ is passed to a second modulator 24.

An audio signal frequency band $E_k$ originating at a microphone 25 and amplified at an input amplifier 26 is passed to a first modulator 27 to which a subcarrier oscillator 28 supplies subcarrier frequency $B_j$. The output of the first modulator 27 is applied as modulation to the carrier $a_i$ in the second modulator 24. The nature of an individual signal impressed upon the circuit shown in Figure 4 is determined by the manner in which the message is impressed on the subcarrier $B_j$ at the first modulator 27. Although the second modulator 24 is a single-side-band suppressed *e* carrier type of modulator it produces no change in the type of modulation, its function being limited to changing the frequency of the signal since the modulated subcarrier $B_j$ is the modulating wave for the second modulator 24. The subcarrier of frequency $B_j$ from the subcarrier oscillator 28 is modulated as described in the first modulator 27 with the audio signal frequency band $E_k$ or other suitable signal after which the modulated subcarrier is translated along the frequency axis by the carrier frequency $a_i$ in the second modulator 24. Side-band components are shown for amplitude modulation in the first modulator 27. Signal from the second modulator 24 is suitably amplified in a power amplifier 30 when necessary and is radiated into space from the transmitter antenna 31.

A number of isolated transmitters may use the same carrier frequency $a_i$ or $nf_s$. In an extreme case all transmitters of a group would use the identical carrier frequency but each would use a different subcarrier such that each station would transmit a single signal. It will be apparent, therefore, that the present invention provides a method suitable for broadcasting, ship-to-shore radio, aircraft and mobile communications and other applications requiring single-channel transmissions.

Figure 5:
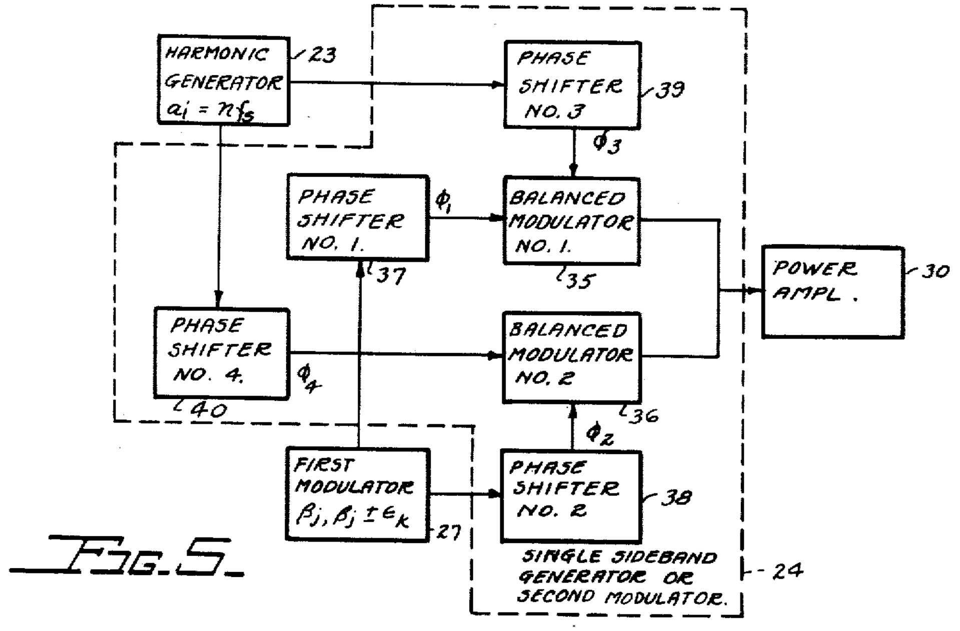
Figure 5 is a block diagram of a single-side-band generator used as the second modulator in the transmitter shown in Figure 4.

In Figure 5 of the accompanying drawings is shown a block diagram of a single-side-band generator suitable for use as the second modulator 24 in the transmitter shown in Figure 4. The single-side-band generator circuit shown in Figure 5 serves to generate a single-side-band-suppressed-carrier signal with the balancing out within the circuit of both the carrier and one of the side bands.

In the circuit shown in Figure 5 the single-side-band generator or second modulator 24 receives carrier frequency $a_i$ input from the harmonic generator 23 and subcarrier input $B_j$ which may or may not be modulated from the first modulator 27. Within the single-side-band generator or second modulator 24 a first balanced modulator 35 and a second balanced modulator 36 each eliminates the carrier frequency $a_i$ and, for each $B_j$ component in, produces a sum-frequency side band of frequency $a_i+B_j$ and a difference frequency side band of frequency $a_i-B_j$. The cancelling of the undesired side band component is accomplished by phasing the input signals so that the undesired side-band component produced by the two modulators 35 and 36 are in phase opposition. The circuit shown in Figure 5 provides phase shifters 37, 38, 39 and 40 that respectively produce phase shifts designated as $\phi_1$ $\phi_2$, $\phi_3$ and $\phi_4$.

The phase of the sum-frequency component for the first balanced modulator 35 is $\phi_3+\phi_1$ while that for the second balanced modulator 36 is $\phi_4+\phi_2$. Similarly the phase of the difference-frequency components are $\phi_3-\phi_1$ and $\phi_4-\phi_2$ respectively. Where it is desired to cancel the sum-frequency components, the phase shifters are adjusted so that the sum-frequency side bands produced by the two modulators are in phase opposition. That is $(\phi_3+\phi_1)-(\phi_4+\phi_2)$ equals $\pm n\pi$ radians where $n$ is an odd number. In a similar manner if it is desired to cancel the difference frequency components the phase shifters are adjusted so that $(\phi_3-\phi_1)-(\phi_4-\phi_2)$ equals $+$ or $-n\pi$ radians where $n$ is odd.

In order to obtain complete cancellation of either the upper or lower side-band components it is necessary to maintain equal amplitudes as well as the necessary phase conditions at the outputs of the two modulators 35 and 36. Phase shifts of $\pi/4$ radians in each of the phase shifters 37, 38, 39 and 40 can be arranged to satisfy either of the above equations and at the same time give equal carrier and equal subcarrier inputs to the two modulators 35 and 36. The use of modulators having matched characteristics will result in complete cancellation of the undesired side-band when such phase shifters are used.

The above described technique has been used experimentally by others to generate single-side-band-suppressed-carrier signals. The necessity for maintaining a constant phase shift in each of the phase shifters 37 and 38 of Figure 5 over the approximate range of 300 to 3,000 cycles per second, is accompanied by difficulty when the modulating voltage is an audio frequency signal. However, for the application to this invention the range over which the phase shift must be maintained constant is very small percentage-wise and suitable phase shifts may be obtained by the use of relatively simple circuitry; in some cases detuned resonant circuits are adequate.

In practice it is convenient to make the phase shifts approximately $\pi/4$ radians. Thus if $\phi_3$ is $+\pi/4$, $\phi_4$ is $-\pi/4$, $\phi_1$ is $-\pi/4$ and $\phi_2$ is $+\pi/4$, the phase conditions are satisfied for cancellation of the difference frequency components.

Figure 6:
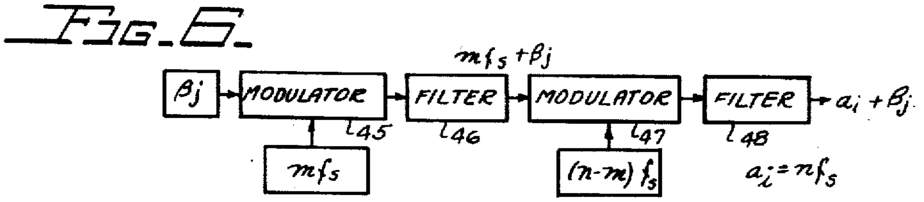
Figure 6 is a simplified block diagram of a method for adding a carrier frequency to a subcarrier frequency in the practice of the present invention.

In Figure 6 of the accompanying drawings is shown a simplified block diagram of another method of adding the carrier frequency $a_i$ to the subcarrier frequency $B_j$ that has been used heretofore in carrier telephony work and for the generation of single-side-band-suppressed-carrier-radio telephone signals. In Figure 6 successive stages of modulation and filtering are used to obtain the desired increase in frequency while at the same time the undesired modulation products are attenuated by filters.

The illustrative circuit in Figure 6 uses two successive steps of modulation and filtering to obtain the desired signal of frequency $a_j+B_j$. In the first modulator 45 the subcarrier signal of frequency $B_j$ modulates the first sinusoid of frequency $mf_s$ and the resultant is filtered by filter 46 to select the component having the sum frequency $mf_s+B_j$. In the second modulator 47 the output of the first filter 46 modulates another sinusoid of frequency $(n-m)\ f_s$ and the final filter 48 selects the signal having the desired frequency $a_i+B_j$ where $a_i$ is equal to $nf_s$.

Figure 7:
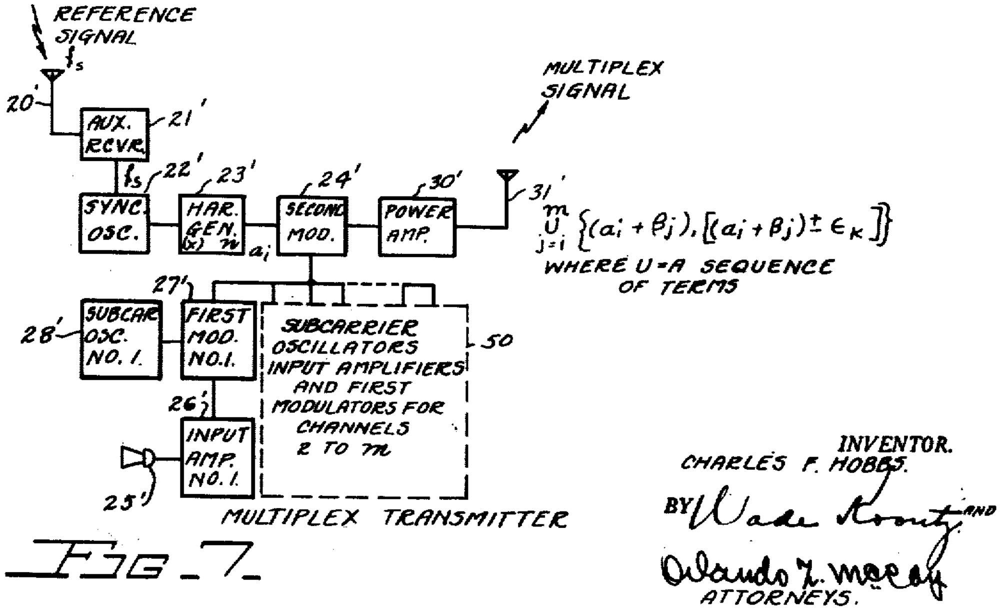
Figure 7 is a block diagram of a multiplex transmitter as a part of the present invention.

In Figure 7 of the accompanying drawings is shown a block diagram of a multiplex transmitter for use in the practice of the present invention. The components in this circuit are comparable with those in Figure 4 and are indicated by corresponding numerals primed, with the exception of a plurality of subcarrier oscillators input amplifiers and first modulators for channels 2 to *m*, designated by the numeral 50, such that the output of a number of subcarrier oscillators are connected to the second modulator 24' in parallel. This procedure places additional band width and power requirements on a second modulator 24' and the power amplifier 30' (when used) of the transmitter.

Figure 8:
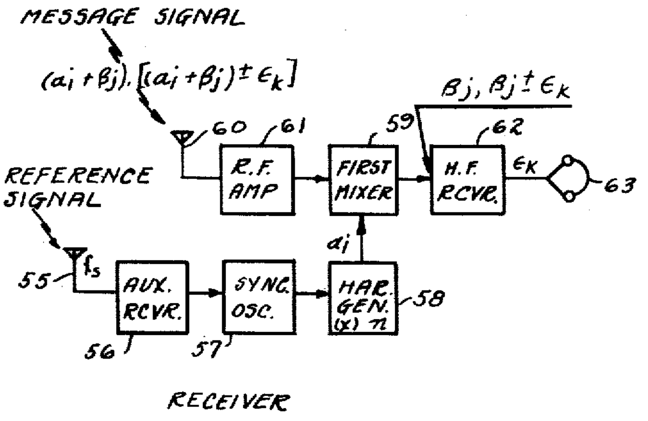
Figure 8 is a simplified block diagram of a receiver used in the practice of the present invention.

In Figure 8 of the accompanying drawings is shown a simplified block diagram of a receiver for use in the practice of the present invention. In the receiver shown in Figure 8 reference signal of standard frequency $f_s$ is intercepted by a receiving antenna 55 and is passed through an auxiliary receiver 56 to a synchronous local oscillator 57. The output from the oscillator 57 is applied to a harmonic generator 58 to produce a local signal of carrier frequency $a_i$ which is used as a local oscillator signal in a first mixer 59. Message signal is intercepted by a second receiving antenna 60 and is passed to a radio frequency amplifier 61, the output from which also is impressed upon the first mixer 59. Output from the first mixer 59 is passed to a high frequency receiver 62, from which the intelligence in the signal may be read by suitable means represented by the ear phones 63.

The basic requirements for the reception of a signal generated by one of the methods outlined above are not materially different from a usual reception where the receiver has sufficient selectivity to separate the desired signal from undesired signal and has sufficient stability to maintain the location of the pass-band in the radio frequency spectrum to include the desired signal once said signal has been selected. In a commercially available very high frequency or ultra high frequency receiver the pass-band is large enough to allow for anticipated instabilities of the local oscillator, change in circuit tuning due to thermal effects and drift in the transmitter frequency. If usual channel spacings are used, very high frequency and ultra high frequency signals generated by the methods outlined herein may be received by available receivers. Because of close channel spacing however, receivers of optimum selectivity are preferred for use in the present invention.

A superheterodyne receiver similar in design to commercially available superheterodyne receivers but having much greater selectivity may be used in the present invention but difficulty would be encountered in holding the pass-band of the receiver at the signal frequency if locally generated oscillations are used for mixing. In overcoming this limitation the local oscillator frequency is synchronized with the carrier frequency, or a harmonic relation is established between these two frequencies such that their relative instability may be reduced to zero and the very narrow pass-band stabilized at the desired signal frequency. Such synchronization requires the availability of reference signal or a signal harmonically related to the reference signal at the point of reception and the use of an auxiliary receiver and harmonic generator to provide the stabilizing signal. The auxiliary receiver may, if preferred, be fixed-tuned and relatively simple. In the case of two-way communications a single auxiliary receiver would serve both the transmitter and the receiver.

The synchronized system has a reliability approaching that of a conventional unsynchronized system when use is made of several reference frequency transmitters operating on harmonically related frequencies and located in different geographical areas together with stand-by units for each of the transmitters also geographically separated from the units to be replaced. The auxiliary receivers are pretuned to the several reference frequencies with provisions for switching to a different frequency automatically, or by push button tuning, in the event a given reference frequency signal falls below a predetermined level or becomes masked by noise and interference.

Figures 9, 10:
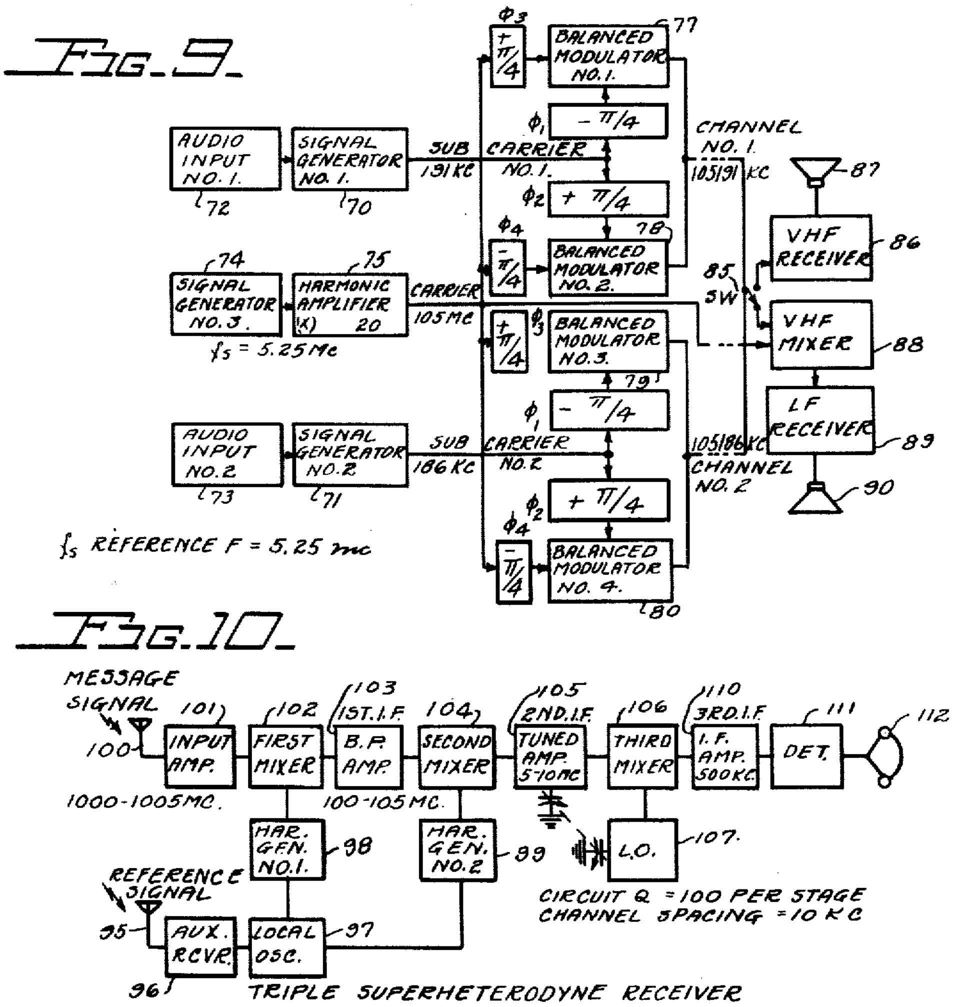
Figure 9 is a block diagram representing the close channel spacing of two signal channels in the present invention.
Figure 10 is a block diagram of a triple-superheterodyne receiver used in the present invention.

The feasibility of close channel spacing in the very high frequency band is demonstrated experimentally in Figure 9 of the accompanying drawings. In Figure 9 first and second signal generators 70 and 71, to which audio inputs 72 and 73 are supplied, provide modulated subcarriers of 191 kilocycles per second and 186 kilocycles per second respectively. A third signal generator 74 supplies, from the reference or standard signal $f_s$ mutiplied twenty times in a harmonic amplifier 75, a carrier frequency of 105 megacycles per second. The subcarrier frequencies of 191 kilocycles per second and 186 kilocycles per second are added to the carrier frequency of 105 megacycles per second to obtain first and second channel frequencies of 105.191 megacycles per second and 105.186 megacycles per second respectively, a separation of only 5 kilocycles per second. It will be noted that in each channel the addition of the subcarrier frequencies to the carrier frequency is accomplished by the use of two balanced modulators. In the first channel, a first balanced modulator 77 and a second balanced modulator 78 add the subcarrier of 191 kilocycles per second to the carrier of 105 megacycles per second. In the second channel a third balanced modulator 79 and a fourth balanced modulator 80 add the subcarrier of 186 kilocycles per second to the carrier of 105 megacycles per second.

Resonant circuits detuned to their half-power points produce phase shifts of $\pi/4$ radians. As a consequence, detuning of the input circuits to each pair of balanced modulators 77, 78, 79 and 80 to produce phase shifts of $\pi/4$ radians, as shown in Figure 9, maintain amplitude balance at the inputs as well as satisfy the condition specified by the equation $(\phi_3-\phi_1)-(\phi_4-\phi_2)=\pm n\pi$ for phase opposition of the difference-frequency components in the output of the two modulators. Thus, if the gains of the two modulators are equal, complete cancellation of the difference-frequency components results.

Experimentally the four resonant circuits were detuned by adjustment while observing the relative amplitude of the sum and difference-frequency components on a spectrum analyzer adapter receiver, in such a way that the sum-frequency components were maximized and the difference-frequency components were minimized and then the gain of one of the modulators was adjusted until complete cancellation of the difference-frequency components was obtained.

The switch 85, representing signal radiation, connects simultaneously both the first and second channels to a usual form of a very high frequency receiver 86 having a speaker 87, or to a very high frequency mixer 88 in which the local oscillator signal is of the same frequency as that of the carrier used to generate the communication signals. Output from the mixer 88 is passed to a common form of low frequency receiver 89 provided with a speaker 90. When the first and second channels are connected through the switch 85 to the very high frequency receiver 86 both programs are received simultaneously because of the large pass-band of the receiver 86. When the first and second channels are switched to the very high frequency mixer 88, either the first or second channel may be selected at will by the tuning of the low frequency receiver 89. The very high frequency mixer 88 and the low frequency receiver 89 can readily separate two 105 megacycle signals that are only 5 kilocycles apart, while the very high frequency receiver 86 cannot accomplish this result.

Receivers used with the proposed system must provide sufficient adjacent channel selectivity and must adequately suppress spurious signals. In the higher frequencies this requires the use of multiple superheterodyne receivers such as that shown in Figure 10.

The triple superheterodyne receiver shown in Figure 10 comprises a reference signal intercepting antenna 95 for the interception of standard signal $f_s$ that is passed to an auxiliary receiver 96 supplying its output to a synchronous local oscillator 97, the output of which is passed to first and second harmonic generators 98 and 99 respectively. Message signal is intercepted by a message signal receiver antenna 100 and is passed to an input amplifier 101 from which it is applied to a first mixer 102 where it is heterodyned with the output from the first harmonic generator 98. The output from the first mixer 102 is amplified in a first I. F. or band-pass amplifier 103 and is passed to a second mixer 104 where it is mixed with the output from the second harmonic generator 99. Output from the second mixer 104 is passed to a second I. F. tuned amplifier 105, the output of which is applied to a third mixer 106 where it is mixed with the frequency from a local oscillator 107. Output from the third mixer 106 is passed to a third I. F. amplifier 110 from which signal is separated in a detector 111 and is made intelligible by suitable means such as by the ear phones 112.

The triple superheterodyne receiver shown in Figure 10 is designed to operate satisfactorily at frequencies of the order of 1,000 megacycles. Adjacent channel selectivity and spurious response to be expected from such a receiver operating at 1,000 megacycles is shown in the following table:

*Spurious response of triple-superheterodyne receiver*

[Channel spacing=10 kc. Circuit Q=100 per stage.]

| | Frequency | Number Stages | Adjacent Channel Response, db | Image Response, db | Maximum Total Intermodulation Distortion, db |
|---|---|---|---|---|---|
| Input Amplifier. | 1,000–1,005 mc. | 2 | ---------- | −62.6 | −39.1 |
| 1st I. F. | 100–105 mc. | 3 | ---------- | −76.8 | −43.8 |
| 2nd I. F. | 5–10 mc. | 3 | ---------- | −76.8 | −54.6 |
| 3rd I. F. | 500 kc. | 5 | −62 | ---------- | ---------- |

It is assumed that channel spacings are 10 kilocycles and that the Q of the single tuned circuit used in any stage of the receiver is 100. The total intermodulation distortion produced by each mixer is the root-mean-square summation of all distortion products formed by a given mixer that fall in a single message channel.

The communications system disclosed herein is suited for providing individual channels for air-to-ground and ground-to-air communications for air traffic control. For this application air-to-ground communications are carried on in one block of frequencies and ground-to-air communications are carried on in another block of frequencies. This provides a flexible system in which two way communications may be carried on simultaneously when necessary.

Figure 11:
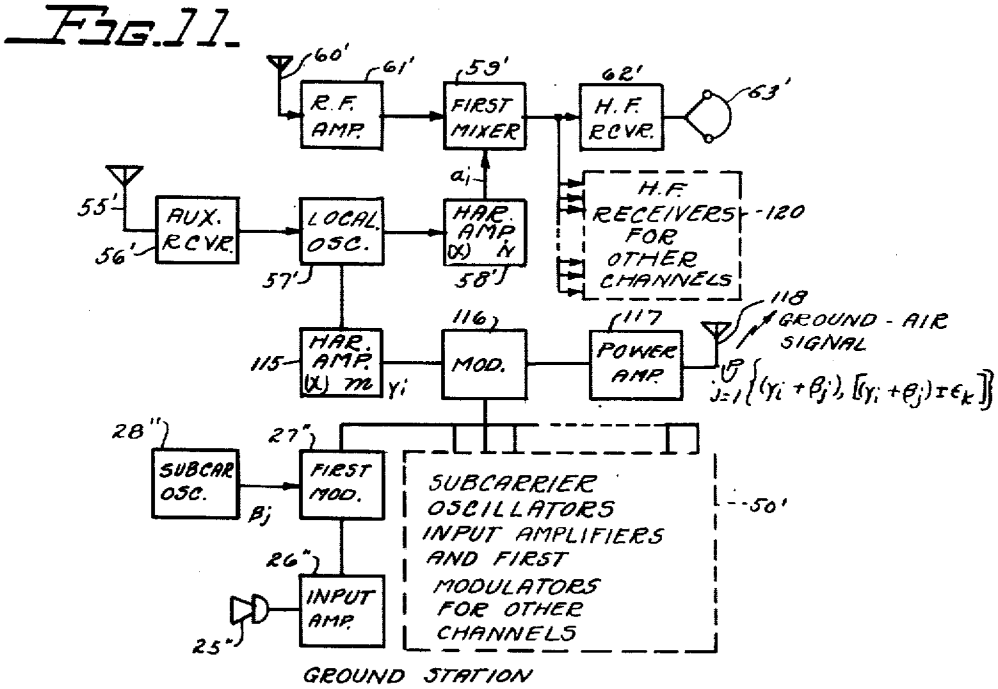
Figure 11 is a simplified block diagram of a ground station of the present invention.

A representative ground station circuit block diagram is shown in Figure 11 of the accompanying drawings wherein components corresponding to those in Figures 7 and 8 are designated by corresponding numerals primed. The same local or synchronous oscillator 57′ supplies oscillations of the same frequency to the harmonic amplifier 58′ to generate the carrier of frequency $a_i$, which is the nth harmonic of $f_s$, for use in the first mixer 59′ and to harmonic amplifier 115 to generate another carrier of frequency gamma sub $i$ or herein $r_i$, the mth harmonic of $f_s$. The carrier frequency $r_i$ is passed to a modulator 116, the output of which is amplified in power amplifier 117 when necessary and is transmitted as ground-to-air signal from the transmitter antenna 118. Output from the first mixer 59′ is passed to high frequency receivers for other channels indicated by the block 120. The multiplex transmitter in Figure 11 operates on the particular carrier frequency gamma sub $i$ or herein $r_i$ and uses rho or $p$ subcarriers where rho is the maximum number of aircraft in contact with the single ground station in Figure 11. If amplitude modulation is used the signal transmitted may be represented in frequency by:

$$\underset{j=i}{\overset{p}{U}}\left\{(\gamma_i+B_j),\ [(\gamma_i+B_j)\pm E_k]\right\}$$

where U is a sequence of terms.

Since surrounding ground stations use other carrier frequencies, the frequency of a composite ground-to-air signal may be written as:

$$\underset{i=1}{\overset{q}{U}}\ \underset{j=1}{\overset{p}{U}}\left\{(\gamma_i+B_j),\ [(\gamma_i+B_j)\pm E_k]\right\}$$

where $q$=number of ground stations.

Figure 12:
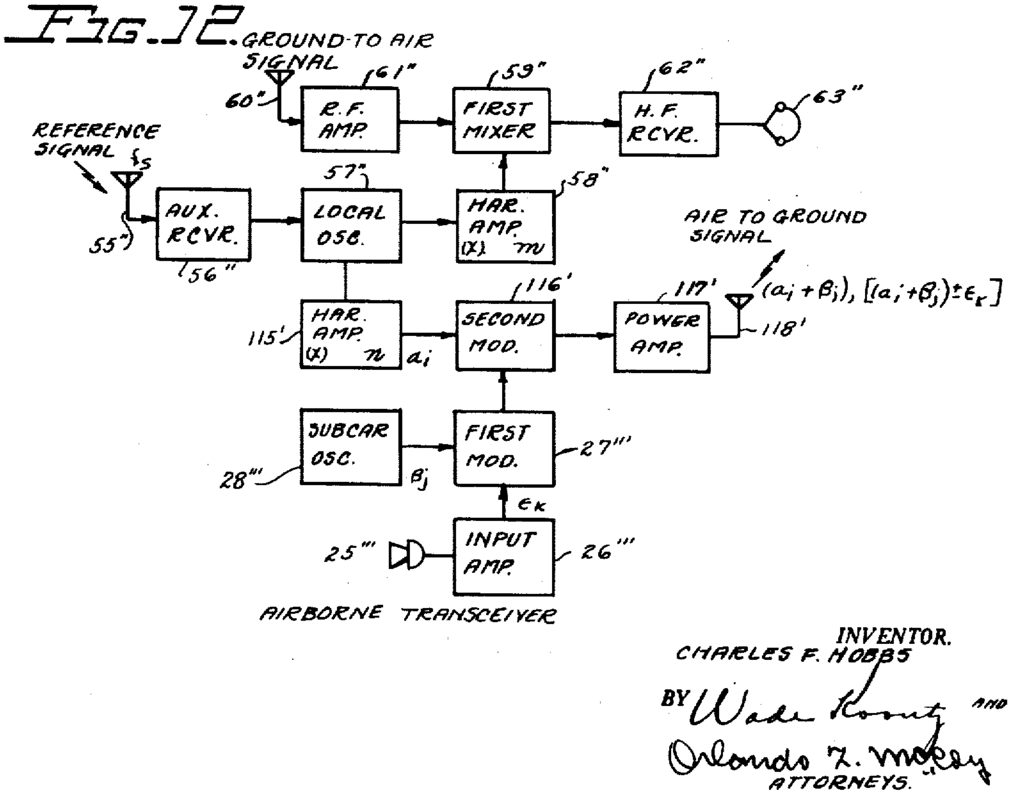
Figure 12 is a simplified block diagram of an airborne transceiver of the present invention.

In Figure 12 of the accompanying drawings is shown a block diagram of an airborne transceiver wherein components comparable with those in the ground station shown in Figure 11 bear corresponding reference numerals further primed. The composite signal represented by the equation in the above paragraph is received by the airborne transceiver shown in block diagram in Figure 12 where the radio frequency amplifier 61″ selects the group of frequencies transmitted by the ground station in Figure 11 in control of the particular aircraft and the high frequency receiver 62″ selects the individual channel assigned to that aircraft. Simultaneously the air-to-ground signal is generated by the transmitter portion of the transceiver and is transmitted from the antenna 118′. The same reference signal $f_s$ is intercepted by the auxiliary receiver antenna 55″ and is used to synchronize the receiver local oscillator signal and the carrier frequency $a_i$ of the transmitter.

If amplitude modulation is used, the individual air-to-ground signal may be represented in frequency by $a_i+B_j$, $[(a_i+B_j)\pm E_k]$.

For $p$ planes the air-to-ground frequencies are:

$$\underset{j=1}{\overset{p}{U}}\left\{(a_i+B_j),\ [(a_i+B_j)\pm E_k]\right\}$$

and for $q$ groups of $p$ planes each group using a different carrier frequency, the composite frequency of the air-to-ground signals are $$\underset{i=1}{\overset{q}{U}}\ \underset{j=1}{\overset{p}{U}}\left\{(a_i+B_j),\ [(a_i+B_j)\pm E_k]\right\}$$

As in the airplane, the radio frequency amplifier 61′ of the ground station shown in Figure 11 selects the proper group of signals and the particular individual signals are selected by the high frequency receivers following the mixer 59', one for each individual channel. A simplified block diagram of a typical individual channel net for air traffic control is shown in Figure 13 of the drawings.

Figure 13:
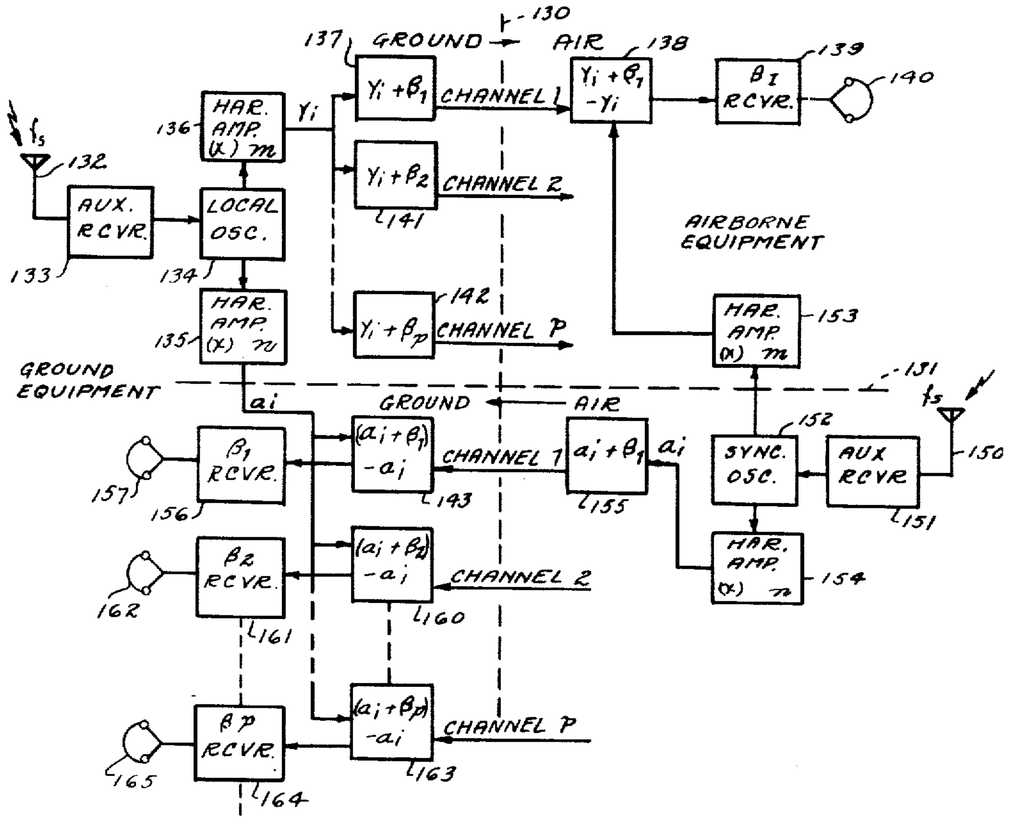
Figure 13 is a simplified block diagram of a typical individual channel net for air traffic control for use in the practice of the present invention.

The circuitry in Figure 13 is divided by an up-and-down dash line 130 to segregate the ground equipment on the left hand side of the line from airborne equipment on the right hand side of the line. At right angles with the line 130 is a cross dash line 131 that, together with the line 130 divides the circuitry into quadrants. Signals from ground-to-air appear from left to right above line 131 and signals from air-to-ground appear from right to left below the line 131.

In the circuit of Figure 13, the standard frequency $f_s$, as a reference frequency, is intercepted by the ground station receiving antenna 132 and is fed to an auxiliary receiver 133 of the ground equipment. Output from the auxiliary receiver 133 is passed to a synchronous local oscillator 134. Output from the synchronous oscillator 134 is passed to harmonic amplifiers 135 and 136 that produce respectively a particular carrier frequency $a_i$, that is a multiple $n$ of the standard frequency $f_s$, and another particular carrier frequency $r_i$ that is another multiple $m$ of the standard frequency $f_s$, respectively.

The ground station transmits a plurality of signals illustratively indicated as a particular carrier frequency $r_i$ plus different subcarriers designated as $B_1$ $B_2$—$B_p$ corresponding to the channels occupied by different signals from the ground station to the airborne equipment. An illustrative first channel in the airborne equipment receives from the ground station as signal carrier frequency $r_i$ + the subcarrier $B_1$. In the airborne first channel the carrier frequency $r_i$ is removed by mixing at detector 138 to impress the subcarrier $B_1$ on an airborne receiver 139, where it is converted into intelligence by suitable means such as head phones 140, or the like. In similar manner airborne equipment for channels 2 to $p$ provide separate reception of a desired plurality of subcarriers $B_2$ etc. to $B_p$.

Within the airborne equipment the particular carrier frequency $r_i$ is generated from the same standard frequency $f_s$ intercepted in the airborne equipment by the antenna 150. The intercepted standard frequency $f_s$ is passed through an auxiliary receiver 151 and a synchronous oscillator 152 to harmonic amplifiers 153 and 154. In the harmonic amplifier 153 the frequency $f_s$ is multiplied by a factor $m$ to provide the particular carrier frequency $r_i$ that is subtracted from $r_i+B_1$ in the detector block 138.

The same standard frequency $f_s$ intercepted by the airborne receiver antenna 150 and passed through the auxiliary receiver 151 and synchronous oscillator 152 is multiplied in the harmonic amplifier 154 by a factor $n$ to provide the carrier frequency $a_i$. The subcarrier $B_1$ is added to the carrier frequency $a_i$ in the airborne transmitter block 155 and is transmitted over air-to-ground equipment for interception at the ground station and admission into the ground station first channel.

The air-to-ground signal $a_i+B_1$ is intercepted at the ground station and the carrier frequency $a_i$ is removed from the intercepted signal as indicated in detector block 143, leaving the subcarrier $B_1$ to be impressed on the ground station receiver 156 and converted into intelligence by suitable means such as by the head phones 157. In a similar manner a desired number of other channels may be maintained in the air-to-ground circuitry, illustrative of which are shown a second channel detector block 160 from which the intelligence in the subcarrier $B_2$ is passed to a receiver 161 for interpretation by head phones 162 and so on to subcarrier signal $B_p$ in channel $p$ indicated by detector box 163 as passing its intelligence conveyed by subcarrier $B_p$ through receiver block 164 for conversion into intelligence by the head phones 165.

As an alternative to the reception of the standard frequency signal by each aircraft or other communication receiver, each carrier frequency signal is transmitted by one station and is received along with the message signal. After suitable filtering and reconditioning it is used to synchronize the receiver local oscillator or it is introduced directly into the first mixer.

Use of the common reference signal or standard frequency $f_s$ instead of locally generated oscillations stabilizes both the radio transmitters and the receivers and permits minimum spacing of communications channels in the very high frequency and higher frequency bands. This technique provides a large increase in the number of radio channels without changing the essential nature of the transmissions and at the same time offers a further increase through the use of single-side-band modulation and other band reducing techniques. The method of communication described herein releases additional frequency spectrum for wide band applications, such as frequency modulation and television broadcasting, in addition to greatly increasing narrow band facilities of all types in the very high frequency and higher frequency bands.

It is to be understood that the radio communication multiplexing system and method that are shown and described herein have been submitted for the purposes of illustrating and describing an operative embodiment of the present invention and that similarly functioning equipment and operations as modifications of the present invention may be used without departing from the scope thereof.

What I claim is:

1. Radio communication multiplexing system multiple superheterodyne receiver to operate illustratively at frequencies in the order of 1,000 megacycles, comprising reference signal intercepting auxiliary receiver means intercepting a single constant frequency standard signal of illustratively five megacycles and of an accuracy approching one part in ten million, synchronous oscillator means to which output from said auxilary receiver means is passed, first and second harmonic generator means to which output from said synchronous oscillator is applied, message signal intercepting antenna means, input amplifier means amplifying the output from said message signal intercepting antenna, a first mixer mixing amplified message signal from said input amplifier means with the output from said first harmonic generator, first intermediate frequency band-pass amplifier amplifying the output from said first mixer, a second mixer mixing amplified output from said first intermediate frequency amplifier with output from said second harmonic generator, second intermediate frequency tuned amplifer amplifying output from said second mixer, a last reference frequency supplying local oscillator means supplying a frequency, a last mixer mixing the last reference local oscillator supplied frequency with output from said preceding second intermediate frequency amplifier, last intermediate frequency amplifier means amplifying output from said last mixer, and detector means extracting intelligence from output of said last intermediate frequency amplifier to determine the message carried by the message signal intercepted by said message signal intercepting antenna.

2. A radio communication multiplexing system station operating illustratively at frequencies above 30 megacycles, comprising an auxiliary receiver intercepting reference signal of a single constant standard frequency of illustratively about five megacycles and of an accuracy approaching one part in ten million, reference signal stabilized synchronous oscillator means providing a local oscillator frequency and to which the output from said auxiliary receiver is applied, a first harmonic amplifier means multiplying by an integral factor $n$ the reference signal intercepted by said auxiliary receiver and received from said synchronous oscillator means to provide a first carrier frequency $a_i$ as output from said first harmonic amplifier, message signal intercepting means, radio frequency amplifier means amplifying the intercepted message signal, first mixer means mixing the message signal with the first carrier frequency, signal frequency radio frequency unmodulated reference signal stabilized high frequency receiver means having channel means to which output from said first mixer is passed for converting the intercepted message signal into intelligence, a second harmonic amplifier means multiplying by an integral factor $m$ the reference signal intercepted by said auxiliary receiver and received from said synchronous oscillator means to provide a second carrier frequency $r_i$ as output from said second harmonic amplifier, means receiving input signal, input signal amplifier means amplifying input signal from said input signal receiving means, subcarrier oscillator means providing subcarrier frequency, first modulator means receiving as input both an amplified input message signal and a subcarrier frequency, second modulator means receiving as input the second carrier frequency $r_i$ from said second harmonic amplifier and the output from said first modulator means, power amplifier means for amplifying the output from said second modulator means, and transmitting means transmitting as radio frequency signal the output from said second modulator.

3. A radio communication multiplexing system transceiver for both transmission and reception at frequencies above 30 megacycles per second, comprising an auxiliary receiver means intercepting reference signal of a single constant standard frequency of illustratively about five megacycles and of an accuracy approaching one part in ten million, synchronous reference signal stabilized oscillator means to which reference signal is supplied from said auxiliary receiver, a pair of harmonic amplifier means receiving the output from said synchronous oscillator and respectively multiplying their inputs by an integral number of times $n$ to provide a first carrier frequency $a_i$ and by another integral number of times $m$ to provide a second carrier frequency $r_i$, incoming radio frequency message signal intercepting means, radio frequency amplifier means amplifying the intercepted incoming radio frequency message signal, first mixer means mixing amplified radio frequency message signal with second carrier frequency $r_i$, high frequency reference signal stabilized receiver means receiving the output from said first mixer, and means for converting into intelligence the output from said receiver, signal intercepting means receiving input signal, input signal amplifier means amplifying input signal from said signal intercepting means, subcarrier oscillator means providing subcarrier frequency, first modulator means receiving as input both the amplified input signal and the subcarrier frequency, second modulator means receiving as input the first carrier frequency $a_i$ from said $a_i$ frequency supplying harmonic amplifier and the ouptut from said first modulator means, power amplifier means amplifying the output from said second modulator means, and transmitting means transmitting as outgoing radio frequency signal the output from said second modulator.

4. The radio communication multiplexing system individual channel net for air traffic control operating at frequencies above 30 megacycles per second; comprising in a system a multiplexing ground station provided with auxiliary receiver means receiving a single constant standard frequency of illustratively about five megacycles and of an accuracy approaching one part in ten million as a reference signal stabilizing the receiver means, a ground station synchronous oscillator to which output from said ground station auxiliary receiver means is supplied, a pair of harmonic amplifiers receiving the output from said ground synchronous oscillator and respectively multiplying their inputs by an integral number $n$ to provide a first harmonic of five megacycles as a first carrier frequency $a_i$ and by another integral number $m$ to provide a second harmonic of five megacycles as a second carrier frequency $r_i$, means joining the subcarriers to second carrier frequency $r_i$ and transmitting the resultant radio frequency signal; an airborne station comprising auxiliary receiver means intercepting the same standard frequency as airborne receiver means stabilizing reference signal intercepted by the ground station auxiliary receiver means, airborne station synchronous oscillator to which output from said airborne station auxiliary receiver means is supplied, a pair of harmonic amplifiers receiving the output from said airborne synchronous oscillator and respectively multiplying their inputs by an integral number $n$ to provide a first carrier frequency $a_i$ and by another integral number $m$ to provide a second carrier frequency $a_i$, airborne means receiving the radio frequency signal from said ground station and detecting by removing the carrier frequency $r_i$ therefrom, means for the isolation of the individual subcarrier and its intelligence therefrom, airborne means joining subcarrier frequency to first carrier frequency $a_i$ for the transmission thereof; and ground station receiver means receiving the radio frequency signals transmitted from several such airborne stations simultaneously and detecting by removing the carrier frequency $a_i$ therefrom for the isolation of the individual subcarriers and the intelligence therefrom.

5. In a radio communications system operating at frequencies above 30 megacycles per second, a transmitter means intercepting a reference radio frequency carrier available to all intercommunicating stations, a local oscillator in said transmitter means providing an oscillator frequency, means generating a desired channel frequency in said transmitter by beating a harmonic of the reference frequency against the frequency of the local oscillator to provide a transmitter beat frequency, means using the transmitter beat frequency for providing a plurality of minimum channel spaces with guard bands between channels limited to expected frequency changes due to doppler effect, means transmitting channeled signal; receiver means intercepting the radio frequency carrier available to all intercommunicating stations and receiving the channeled signals from the transmitter, a receiver local oscillator providing an oscillator frequency, receiver means generating a desired channel frequency by beating a harmonic of the intercepted reference frequency with the local oscillator frequency, and receiver means selecting and deriving intelligence from a desired channel as a pass band of sufficient width for signal reception with minimized attenuation.

6. A radio communication multiplexing system having a transmitter, comprising reference signal receiver means supplying a single standard frequency in the radio frequency range and of a frequency accuracy of about one part in ten million, means multiplying the received standard frequency to provide as a harmonic thereof a carrier frequency for transmission from said transmitter, means for applying modulation to the carrier frequency by the combination therewith of modulated subcarrier frequencies with respect thereto, and means providing message signal modulations of subcarrier signals, and inclusive of a harmonic generator supplying the carrier frequency to a single-side-band generator, said single-side-band generator comprising a first balanced modulator, a first pair of phase shifters of which one receives carrier frequency from the harmonic generator and the other receives a modulated subcarrier from a first modulator and both of which first pair of phase shifters shift the phase of the output from said first balanced modulator, a second balanced modulator, and a second pair of phase shifters of which one receives carrier frequency from the harmonic generator and the other receives a modulated subcarrier from the first modulator and both of which second pair of phase shifters shift the phase of the output from the second balanced modulator in such a manner that one pair of side-band outputs from the two balanced modulators are in phase and the other pair of side-band outputs are in phase opposition.

References Cited in the file of this patent

UNITED STATES PATENTS

| | | |
|---|---|---|
| 1,403,841 | Carson | Jan. 17, 1922 |
| 1,721,492 | Wurst | July 16, 1929 |
| 1,724,922 | Heising | Aug. 20, 1929 |
| 1,742,902 | Deloraine | Jan. 7, 1930 |
| 1,797,284 | Coram | Mar. 24, 1931 |
| 1,802,760 | Gage | Apr. 28, 1931 |
| 2,067,353 | Snow | Jan. 12, 1937 |
| 2,155,821 | Goldsmith | Apr. 25, 1939 |
| 2,164,032 | Day | June 27, 1939 |
| 2,388,906 | Corderman | Nov. 13, 1945 |
| 2,476,162 | Thompson | July 12, 1949 |

UNITED STATES PATENT OFFICE

Certificate of Correction

August 6, 1957

Patent No. 2,802,208

Charles F. Hobbs

It is hereby certified that error appears in the printed specification of the above numbered patent requiring correction and that the said Letters Patent should read as corrected below.

Column 1, line 23, for "bandwith" read —bandwidth—; column 3, line 1, after "source" insert —such—; line 35, for "bandwith" read —bandwidth—; line 68, after "narrow" insert —band—; column 4, line 20, for "tarnsmitters" read —transmitters—; column 5, line 28, for "$B_i$" read —$B_j$—; line 63, for "suppressed e carrier" read —suppressed-carrier—; column 6, line 35, and throughout the patent, concerning the phase shifts "$\phi$" it is to be understood that the numerical values were expressed in the application as subscripts and are not to be interpreted in the patent as products; column 7, line 16, strike out "$a_j+B_j$" and insert instead —$a_i+B_j$—; column 12, line 40, for "auxilary" read —auxiliary—; column 13, line 5, for "signal", second occurrence, read —single—; lne 56, for "ouptut" read —output—; column 14, line 15, for "$a_1$," read —$r_1$,—.

Signed and sealed this 21st day of January 1958.

[SEAL]

Attest:
KARL H. AXLINE,
*Attesting Officer.*

ROBERT C. WATSON,
*Commissioner of Patents.*